United States Patent
Fortune et al.

(10) Patent No.: US 7,159,471 B2
(45) Date of Patent: Jan. 9, 2007

(54) CAPACITIVE LOAD CELL APPARATUS HAVING SILICONE-IMPREGNATED FOAM DIELECTRIC PADS

(75) Inventors: Duane D. Fortune, Lebanon, IN (US); Henry M. Sanftleben, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 148 days.

(21) Appl. No.: 11/070,045

(22) Filed: Mar. 2, 2005

(65) Prior Publication Data
US 2006/0196276 A1 Sep. 7, 2006

(51) Int. Cl.
*G01B 7/16* (2006.01)
(52) U.S. Cl. .............. 73/780; 73/718; 73/724; 73/862.046; 73/862.473; 361/312; 340/438
(58) Field of Classification Search ............ 73/718, 73/724, 780, 862.046, 862.473; 361/312
See application file for complete search history.

(56) References Cited

U.S. PATENT DOCUMENTS

| | | | | |
|---|---|---|---|---|
| 3,875,481 A | * | 4/1975 | Miller et al. ............ | 361/283.1 |
| 4,266,263 A | | 5/1981 | Haberl et al. | |
| 4,370,697 A | * | 1/1983 | Haberl et al. ............ | 361/283.1 |
| 4,584,625 A | * | 4/1986 | Kellogg .................. | 361/283.1 |
| 4,836,033 A | | 6/1989 | Seitz | |
| 5,060,527 A | * | 10/1991 | Burgess .................. | 73/862.68 |
| 5,878,620 A | * | 3/1999 | Gilbert et al. ............ | 73/172 |
| 5,927,427 A | * | 7/1999 | Sewell et al. ............ | 180/273 |
| 6,448,789 B1 | * | 9/2002 | Kraetzl .................... | 324/658 |
| 6,499,359 B1 | | 12/2002 | Washeleski et al. | |
| 6,989,677 B1 | * | 1/2006 | Morimoto ................ | 324/660 |
| 6,999,301 B1 | | 2/2006 | Sanftleben et al. | |
| 2004/0159158 A1 | * | 8/2004 | Forster .................... | 73/718 |
| 2005/0043876 A1 | | 2/2005 | Fultz et al. | |
| 2005/0097973 A1 | * | 5/2005 | Waidner et al. .......... | 73/862.454 |
| 2006/0091716 A1 | * | 5/2006 | Fortune et al. ........... | 297/452.41 |
| 2006/0092032 A1 | * | 5/2006 | Manlove et al. .......... | 340/667 |

OTHER PUBLICATIONS

International Search Report dated Feb. 2, 2006.—European Patent Application No. 06075437.1.

* cited by examiner

*Primary Examiner*—Edward Lefkowitz
*Assistant Examiner*—Freddie Kirkland, III
(74) *Attorney, Agent, or Firm*—Jimmy L. Funke

(57) ABSTRACT

A capacitive load cell includes upper and lower capacitor plates and an intermediate array of dielectric pads formed of silicone-impregnated open-cell urethane foam (i.e., gel pads). The silicone essentially displaces air that would otherwise be trapped in the foam, contributing to a dielectric having minimal humidity-related variability. The upper capacitor plate is defined by an array of individual charge plates, the lower capacitor plate defines a ground plane conductor common to each of the charge plates, and the dielectric pads are disposed between the ground plane conductor and each of the charge plates, leaving channels between adjacent dielectric pads. When occupant weight is applied to the seat, the dielectric pads transmitting the weight distend laterally into the channels to reduce the separation between the respective upper and lower capacitor plates, and the consequent change in capacitance is detected as a measure of the applied force and the force distribution.

3 Claims, 2 Drawing Sheets s
CAPACITIVE LOAD CELL APPARATUS HAVING SILICONE-IMPREGNATED FOAM DIELECTRIC PADS

TECHNICAL FIELD

The present invention relates to a capacitive load cell for estimating occupant weight applied to a vehicle seat, and more particularly to a load cell having a dielectric material that minimizes humidity-related error.

BACKGROUND OF THE INVENTION

Various sensing technologies have been utilized to classify the occupant of a vehicle seat for purposes of determining whether to enable or disable air bag deployment, and/or for purposes of determining how forcefully an air bag should be deployed. The present invention is directed to an approach in which at least one capacitive load cell is installed in a vehicle seat, and the capacitance of the load cell is measured to provide an indication of the weight applied to the seat and/or the distribution of the applied weight. In general, a capacitive load cell includes at least first and second conductive plates separated by a compressible dielectric such as a sheet of rubber or urethane foam. For example, representative capacitive load cells are disclosed in the U.S. Pat. No. 4,266,263 to Haberl et al., issued on May 5, 1981. Additionally, the U.S. Pat. No. 4,836,033 to Seitz; U.S. Pat. No. 5,878,620 to Gilbert et al.; U.S. Pat. No. 6,448,789 to Kraetzl; and U.S. Pat. No. 6,499,359 to Washeleski et al. show capacitive load cells as applied to vehicle seats for sensing occupant weight or weight distribution. While urethane foam is commonly used as a compressible dielectric due to its low cost and low weight, its dielectric constant tends to vary with humidity due to the presence of air trapped in the foam. The variability of the dielectric constant is clearly undesirable because it degrades accuracy and repeatability of the load measurement. Accordingly, what is needed is a foam dielectric capacitive load cell that is less susceptible to humidity-related error.

SUMMARY OF THE INVENTION

The present invention is directed to an improved capacitive load cell apparatus for measuring weight applied to a vehicle seat, including upper and lower capacitor plates and an intermediate dielectric comprising an array of pads formed of silicone-impregnated open-cell urethane foam (i.e., gel pads). The silicone essentially displaces air that would otherwise be trapped in the foam, contributing to a dielectric having minimal humidity-related variability. In a preferred embodiment, the upper capacitor plate comprises an array of individual charge plates, the lower capacitor plate defines a ground plane conductor common to each of the charge plates, and the dielectric pads are disposed between the ground plane conductor and each of the charge plates, leaving channels between adjacent dielectric pads. When occupant weight is applied to the seat, the dielectric pads transmitting the weight distend laterally into the channels to reduce the separation between the respective upper and lower capacitor plates, and the consequent change in capacitance is detected as a measure of the applied weight and the weight distribution.

DESCRIPTION OF THE PREFERRED EMBODIMENT

While the capacitive load cell apparatus of the present invention may be used in various applications, it is disclosed herein in the context of an apparatus for detecting the weight and/or distribution of weight applied to a vehicle seat. In general, a capacitive load cell comprises upper and lower conductor plates separated by a compressible non-conductive dielectric, such that mechanical loading of the cell reduces the separation distance of the conductor plates, increasing the electrical capacitance between the upper and lower plates. As applied to a vehicle seat, the capacitive load cell is preferably disposed between the frame and bottom cushion of the seat as depicted herein, but it will be understood that the load cell may be installed in a different location such as in the bottom cushion, in or behind a back cushion, and so on.

Figure 1:
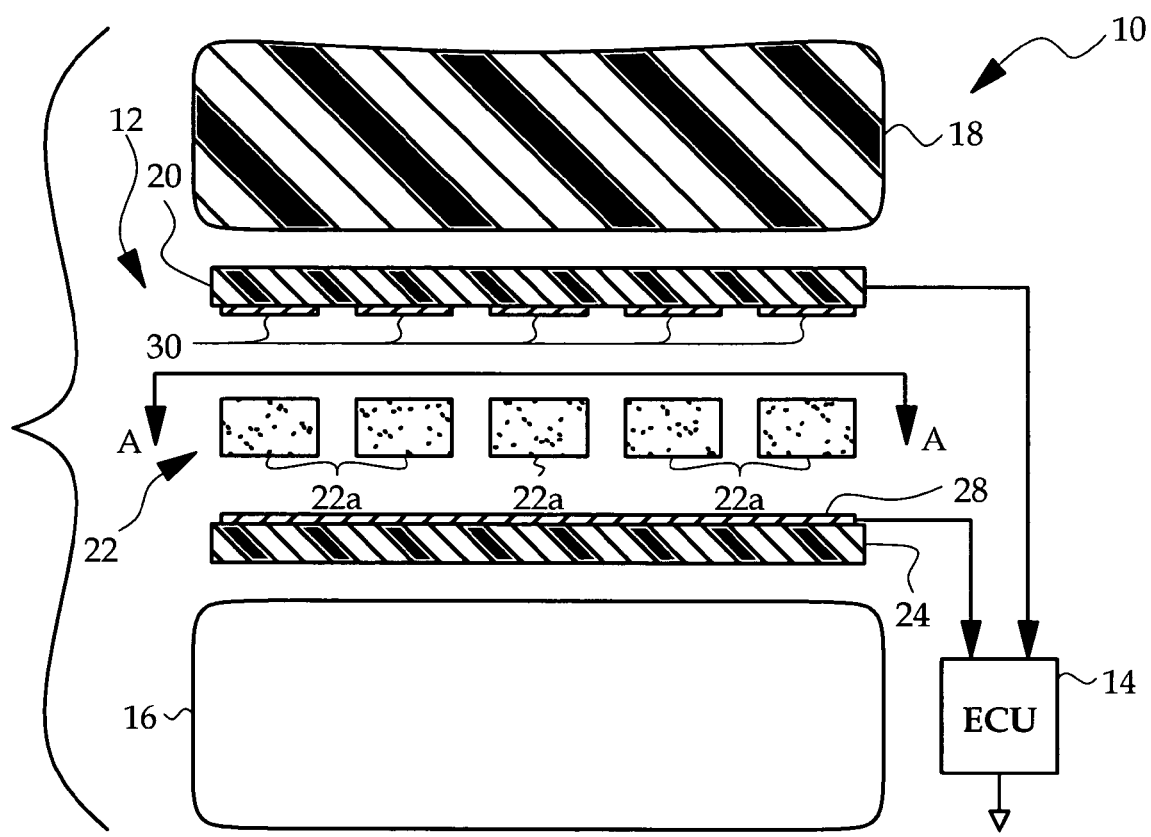
FIG. 1 is an exploded diagram of a vehicle seat and a sensing apparatus including a capacitive load cell according to the present invention.

Referring to FIG. 1, the reference numeral 10 generally designates a seat bottom and sensor apparatus according to this invention. The sensor apparatus includes a capacitive load cell 12 and an electronic control unit (ECU) 14. The load cell 12 is disposed between the seat frame 16 and a foam cushion 18, and includes an upper substrate 20, a dielectric 22, and a lower substrate 24. A reference plane conductor 28 is formed on lower substrate 24 adjacent the lower surface of dielectric 22, and a number of charge plate conductors 30 are formed on upper substrate 20 adjacent the upper surface of dielectric 22. The upper and lower substrates 20, 24 are non-conductive, and may be formed of a material such as polyester or polyimide with a thickness of about 0.1 mm. The conductors 28, 30 may be metal foil pads laminated to the respective substrates 20, 24. The reference plane conductor 28 and each of the charge plate conductors 30 are separately coupled to ECU 14, which periodically measures capacitance values between the reference plane conductor 28 and each of the charge plate conductors 30. The measured capacitances provide an indication of the force applied to seat cushion 18, as well as the distribution of the force, for purposes of detecting the presence of an occupant and classifying the occupant as a child, an adult, a child seat, or some other classification.

Figure 2:
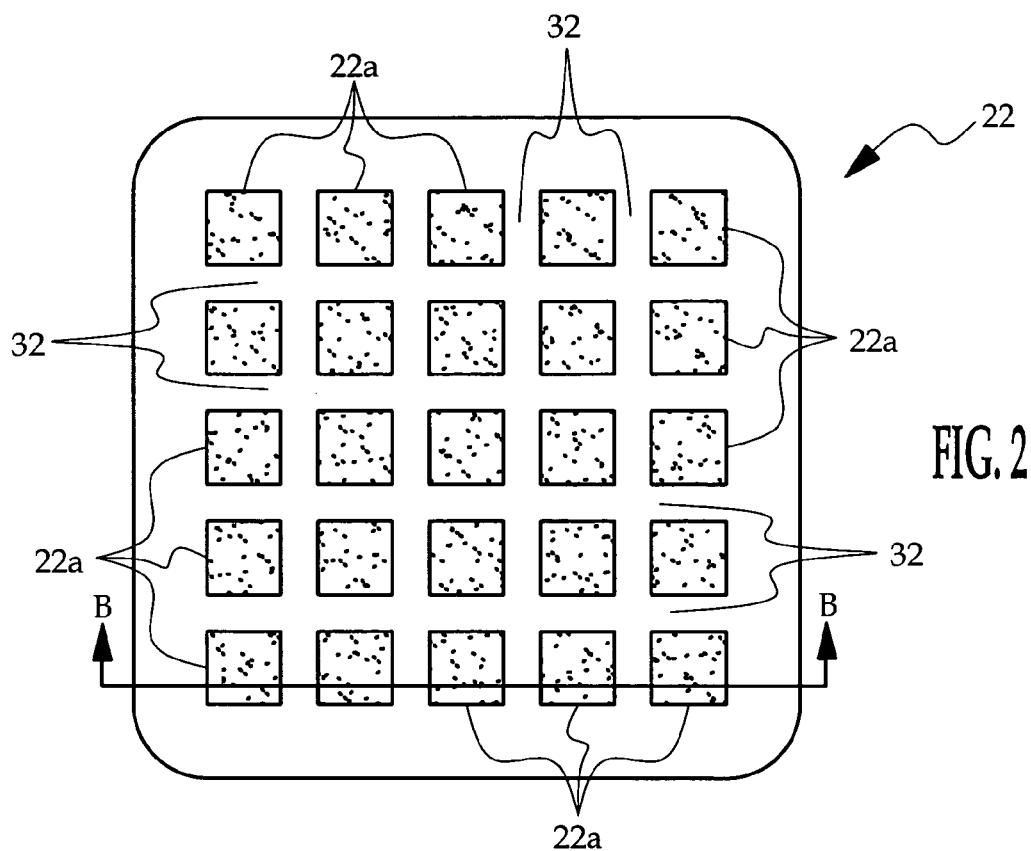
FIG. 2 is a view of the load cell of FIG. 1 taken along lines A—A.

According to the present invention, the dielectric 22 comprises a pattern of dielectric pads 22a that generally correspond in shape and dimension with the charge plate conductors 30, with individual pads 22a being disposed between the reference plane conductor 28 and each charge plate conductor 30. The diagram of FIG. 2 is a view of load cell 12 with the upper substrate 20 and charge plates 30 removed, as indicated by the lines A—A in the exploded view of FIG. 1. In the illustrated embodiment, the dielectric pads 22a, as well as the charge plate conductors 30, are generally square in shape and disposed in a 5×5 array, with vacant channels 32 between adjacent dielectric pads 22a. While other shapes and array configurations are obviously possible, it is important that the space between each charge plate conductor 30 and the reference plane conductor 28 be fully occupied by a dielectric pad 22a, and that there be channels 32 between adjacent dielectric pads 22a.

Figure 3A:
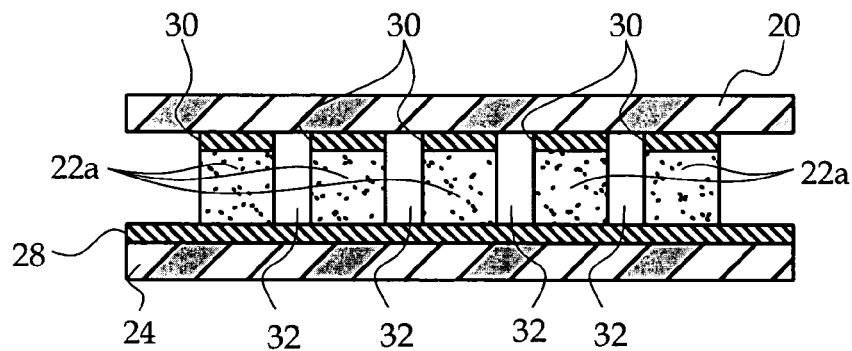
FIG. 3A is a partial cross-sectional view of the load cell of FIG. 1 taken along lines B—B of FIG. 2 when the vehicle seat is empty.
Figure 3B:
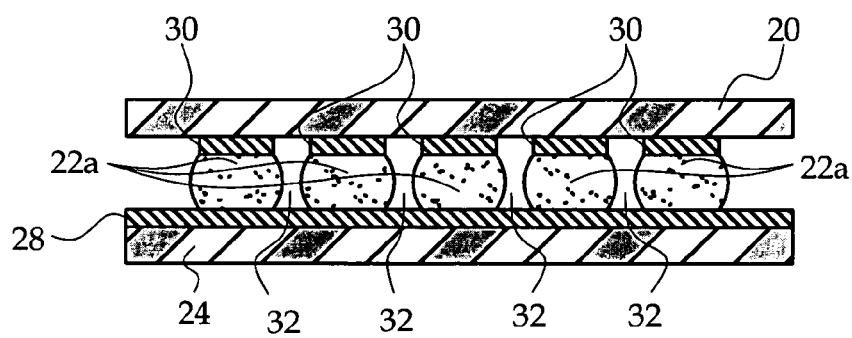
FIG. 3B is a partial cross-sectional view of the load cell of FIG. 1 taken along lines B—B of FIG. 2 when the vehicle seat is occupied.

FIGS. 3A and 3B depict partial cross-sectional views of the load cell 12, for example along lines B—B of FIG. 2. FIG. 3A depicts the load cell 12 in a relaxed state when no occupant weight is applied to the seat 10. In this state, the dielectric pads 22a are substantially uncompressed, and have a thickness on the order of 0.20 inch, for example. FIG. 3B depicts the load cell 12 in a loaded state when significant occupant weight is applied to the seat 10. The occupant weight is transmitted to the seat frame 16 through some or all of the dielectric pads 22a, and the dielectric pads 22a through which the weight is transmitted distend laterally into the channels 32 to reduce the separation between the reference plane conductor 28 and respective charge plate conductors 30. In a fully compressed condition, the dielectric pads may have a thickness on the order of 0.07 inch, for example.

According to this invention, the dielectric pads 22a are formed of silicone-impregnated open-cell urethane foam, commonly referred to as gel pads. Of particular significance to the present invention, air that would ordinarily be present in plain open-cell foam material is substantially replaced by the silicone fluid so that there is substantially no air trapped between the reference plane conductor 28 and the various charge plate conductors 30. The substantial absence of trapped air significantly enhances the performance of load cell 12 compared to load cells in which the dielectric material consists of plain open-cell or closed-cell foam because the dielectric constant of air trapped in the dielectric varies widely with variations in ambient humidity. And of course, the variations in the dielectric constant of the trapped air contribute to significant variation in the overall dielectric constant of the individual load cell capacitors. This is a particular concern when the load cell is installed in a vehicle seat due to the wide humidity variations typically observed in a vehicle. On the other hand, the substantial absence of trapped dielectric air in the load cell 12 of the present invention minimizes humidity-related measurement error.

Various processes may be used to manufacture capacitive load cells according to the present invention. For example, the dielectric pads 22a may be presented on a carrier that is positioned in proper alignment with the charge plate conductors 30. The dielectric pads 22a would then be bonded to the charge plate conductors 30 or substrate 20, the the carrier would be removed, and the dielectric pads 22a would be bonded to the lower substrate 24. Alternately, a continuous rectangular pad of dielectric material could be bonded to the upper substrate 20 and/or charge plate conductors 30, and the portions of the dielectric material corresponding to the channels 32 mechanically removed by cutting, or the like. Obviously, other processes and process variations will occur to those skilled in the art.

While the load cell apparatus of the present invention has been described with respect to the illustrated embodiment, it is recognized that numerous modifications and variations in addition to those mentioned herein will occur to those skilled in the art. For example, the load cell may be used in non-automotive environments, the shape and number of charge plate conductors can be varied to suit a given application, etc. Also, the load cell conductors 28, 30 do not have to be in contact with the dielectric pads 22a, but may be located on the outboard surfaces of the respective substrates 24, 20, and so on. Accordingly, it is intended that the invention not be limited to the disclosed embodiment, but that it have the full scope permitted by the language of the following claims.

The invention claimed is:

1. Capacitive load cell apparatus including first and second conductor plates separated by a compressible dielectric such that force applied to the load cell compresses the dielectric to increase a capacitance between the first and second conductor plates, the improvement wherein:

the compressible dielectric comprises an array of silicone impregnated open-cell foam pads having substantially no air trapped therein, where said pads laterally distend into channels between adjacent pads as they are compressed in response to said force so that the increase in capacitance between the first and second conductor plates is indicative of said force.

2. The apparatus of claim 1, where said first conductor plate comprises an array of spaced charge plate conductors, and said silicone impregnated open-cell foam pads are disposed between each of said charge plate conductors and said second conductor plate.

3. A capacitive load cell comprising:

an array of spaced charge plate conductors supported on a first substrate;

a reference plane conductor supported on a second substrate; and an array of dielectric pads formed of silicone impregnated open-cell foam disposed between said first and second substrates, said dielectric pads bridging a space between said reference plane conductor and each of said charge plate conductors, with vacant channels between adjacent dielectric pads, where force applied to said load cell causes said dielectric pads to laterally distend into said channels to reduce a distance between said reference plane conductor and respective charge plate conductors in relation to a magnitude and a distribution of such force, producing corresponding increases in capacitance between said reference plane conductor and said respective charge plate conductors.

* * * * *